Nov. 21, 1944. V. R. CLARK 2,363,043
V-BELT AND FASTENER
Filed Aug. 6, 1942
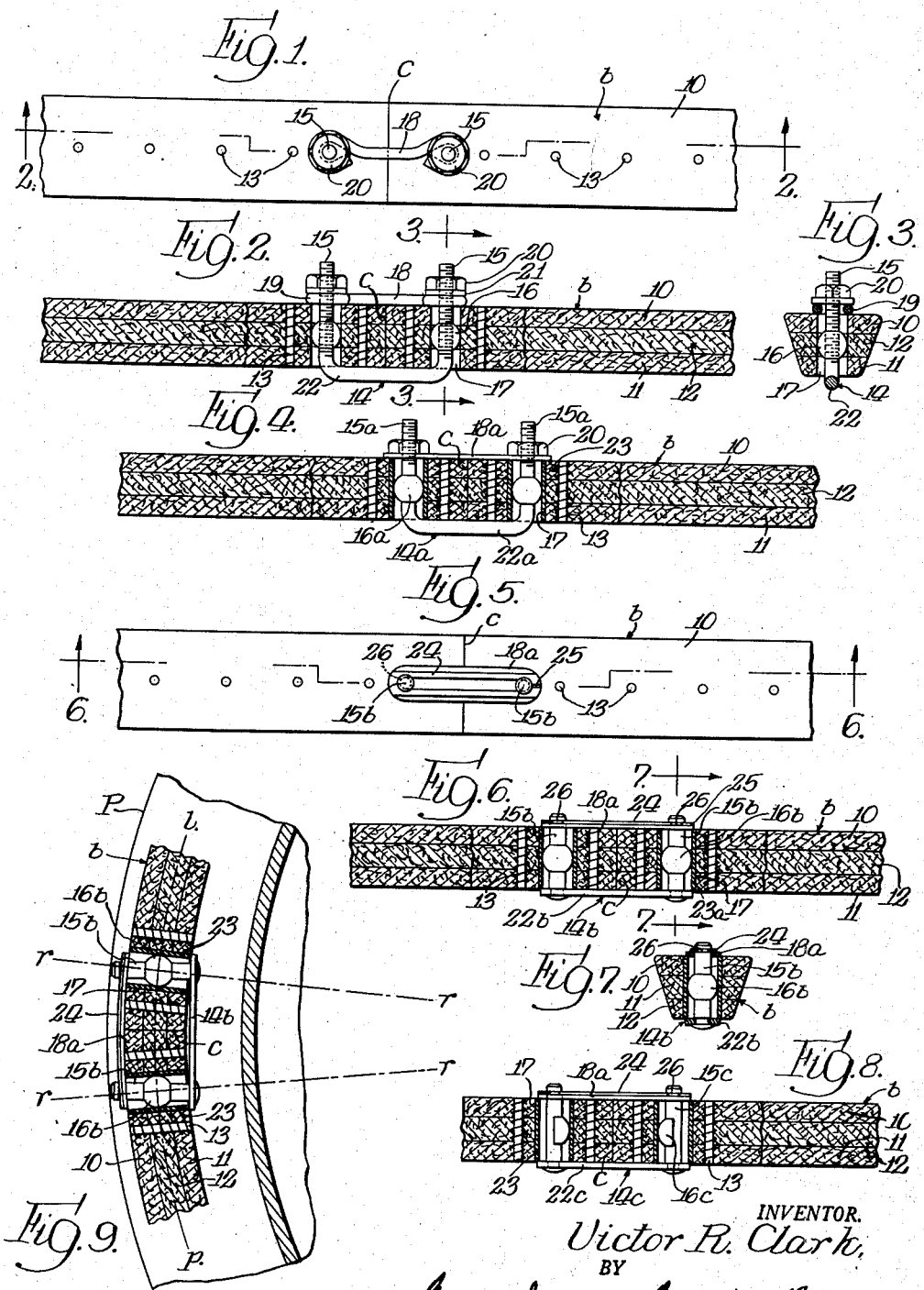
INVENTOR.
Victor R. Clark,
BY Patented Nov. 21, 1944

2,363,043

UNITED STATES PATENT OFFICE 2,363,043

V-BELT AND FASTENER

Victor R. Clark, Chicago, Ill.

Application August 6, 1942, Serial No. 453,771

7 Claims. (Cl. 74—234)

This invention relates to machine belts and fastener means therefor, and has to do particularly with V-belting and means for securing together the ends of lengths of such belting to form belts therefrom.

The pull in a V-belt is concentrated along the pitch line, and as the belt bends about the pulleys the outer or top portion stretches, and the inner or bottom portion is compressed, to absorb the resultant differences in length, the load being carried at the middle portion or pitch line area of the belt. In practice, V-belts are commonly manufactured and sold as endless belts. That frequently necessitates the dismantling of machines or shafting supports to permit installing of such belts, which is objectionable for obvious reasons. Attempts have been made to avoid that difficulty by providing hooks or fasteners for securing together the ends of appropriate lengths of V-belting. The known fastening devices with which I am familiar are clamped or riveted to the belt ends in such manner as to form therewith a solid, inflexible mass, while necessitating spacing apart a considerable distance of the ends of the belting. When such a device passes over the pulleys the pull is diverted from the pitch line of the belt, which causes spasmodic changes in speed of the driven machine and objectionable vibration, both objectionable in the operation of ordinary machines and particularly objectionable when operating machines, such as grinding or precision machines, requiring constant speed operation. Also, the spacing apart of the ends of the belting aggravates the objectionable conditions referred to, and causes jumps or jerks in the drive of the pulley, and abrupt changes in the belt speed as it travels about the pulley, which objectionable conditions frequently result in imperfections in the work done by machines driven by V-belts provided with the known fastening devices referred to.

My invention is directed to a V-belt and a fastener therefor which will avoid the above noted objections to the known belts and fasteners referred to. To that end I provide a fastener which enables securing the ends of the belting together with their end surfaces in juxtaposition, thus providing a substantially continuous belt, and which accommodates bending of the end portions of the belting to conform to the curvature of the pulley in passing about the latter. More specifically, the fastener comprises a substantially U-shaped member the arms of which pass through the end portions of the belting and are provided with rounded surfaces providing, in effect, pivot points or areas permitting relative tilting movement between the arms and the belt ends. The fastener of my invention is well suited, in its broader aspects, for use with various types of V-belts, but certain forms of my fastener are intended particularly for use with a V-belt of special construction, which constitutes a feature of my invention. I provide a V-belt comprising top and bottom layers or plies of firm, wear-resisting but elastic leather, such as chrome leather, or equivalent material, which spreads and grips the pulley side, and is stretchable and compressible to fit readily about the pulley, and a central layer or ply of oak leather, or equivalent material, which is tough and firm, stretch resistant, and of high tensile strength, located at the pitch line area of the belt and of adequate strength for taking the load to which the belt is subjected in use. Further objects and advantages of my invention will appear from the detail description.

In the drawing:

Figure 1 is a fragmentary plan view of a V-belt embodying my invention;

Figure 2 is a sectional view taken substantially on line 2—2 of Figure 1, certain parts being shown in elevation;

Figure 3 is a sectional view taken substantially on line 3—3 of Figure 2, certain parts being shown in elevation;

Figure 4 is a view similar to Figure 2, but showing a modified form of fastening means;

Figure 5 is a view similar to Figure 1, but showing a second modified form of fastening means;

Figure 6 is a sectional view taken substantially on line 6—6 of Figure 5, certain parts being shown in elevation;

Figure 7 is a sectional view taken substantially on line 7—7 of Figure 6, certain parts being shown in elevation;

Figure 8 is a view similar to Figure 6, but showing a third modified form of fastening means; and Figure 9 is a fragmentary view, partly in section and partly in elevation, of a V-pulley and a V-belt embodying the fastener of Figures 5 to 7, inclusive, applied to the pulley.

The V-belting of my invention is of multi-ply structure, and comprises top and bottom plies 10 and 11, respectively, formed of a material which is firm and wear-resisting, but sufficiently elastic to grip firmly the side walls of the V-pulley, while being capable of stretching at the top or outer side of the belt, and of being compressed at the inner or bottom side thereof, to absorb or accommodate differences in length between the top and the bottom of the belt as it passes about the pulley. Preferably, the plies 10 and 11 are formed of chrome leather or equivalent material having the characteristics referred to. The belting also comprises a center ply 12 which is tough and firm while being stretch resistant and of high tensile strength adequate to carry the load imposed upon the belt. Preferably the center ply 12 is formed from oak leather or equivalent material having the desired characteristics. The plies of the belting may be secured together in any suitable known manner, as by means of a suitable adhesive, and may be further secured together by threaded members 13 of known type inserted through the plies along the transverse center line of the belting. While I preferably use the fastener of my invention, to be described presently, with belting constructed in the manner illustrated and above described, the fastener of my invention may be used with any suitable belting, considered in its broader aspects, though there are certain advantages in using that fastener with the belting of my invention, as will be pointed out more fully.

In constructing a V-belt in accordance with my invention, a suitable length of belting constructed as above, designated b, is selected, and the ends of this belting are secured together with the end surfaces thereof in contact as shown at c. That is accomplished by means of a fastener comprising a U-shaped member 14, shown in Figures 1 to 3, inclusive, conveniently formed from a length of wire of circular or other suitable cross section bent into the shape shown. Each arm 15 of member 14 is threaded for the major portion of its length, and has mounted thereon a ball 16 disposed within a cylindrical opening 17 extending through belting b a short distance from each end thereof. A retainer 18, conveniently formed from a suitable length of wire, provided at each end with an eye 19, is disposed over arms 15 at the outer or top face of belting b, and nuts 20 are screwed tightly onto the outer end portions of arms 15 and bear against the outer faces of washers 21 seating on eyes 19, thus securing member 14 in position with bight portion 22 thereof at the inner or under side of the belting. With member 14 thus secured in position, the balls 16 are disposed in the plane of center ply 12 of the belting, which center ply is at the pitch line area of the belt thus produced. The balls 16 contact ply 12 at the openings 17 and provide rounded areas of contact or pivot points therewith, permitting relative tilting or flexing of the end portions of the belt in its passage about the pulleys.

Since the end portions of the belt have relative tilting movement to accommodate bending or flexing of the belt as it passes about the pulleys, the load is maintained at the pitch line area of the belt, and no vibration or variation in speed, due to shift in the line of pull of the belt, is encountered. Also, since the end surfaces of the belt are held close together or in contact with each other, there is no objectionable gap between the ends of the belt, and objectionable jumps and jerks in the drive of the pulley about which this belt passes are thus eliminated. The fastening means of my invention illustrated in Figures 1 to 3, inclusive, thus renders it possible to secure together the ends of V-belting so as to provide a V-belt of desired length, which presents a practically continuous and unbroken contact surface with the pulley and assures that the line of pull or load of the belt will be maintained at the pitch line area thereof, assuring smooth and efficient operation of the pulley to which this belt is applied.

In cases where the belting used is of different construction than that above disclosed, or is of the same construction but is subjected to heavy loads, there may be a tendency for the balls 16 to press into the belting to an objectionable extent. In order to avoid that difficulty I provide the fastening means disclosed in Figure 4, comprising a U-shaped member 14a each arm 15a of which is provided with a ball 16a formed integral therewith, this ball being disposed within a cylindrical metal tube 23, preferably formed of steel, inserted through the belting b a short distance from each end thereof. A retainer 18a, in the form of a comparatively thin steel plate, is placed over the outer end portions of arms 15a of member 14a, and is confined between the outer or top surface of the belt and nuts 20 screwing on to arms 15a, bight portion 22a of member 14a being disposed at the inner or lower side of the belt, as before. The tubes 23 effectively prevent the balls 16a pressing into the belt to an objectionable extent, while providing pivots permitting relative flexing or tilting of the end portions of the belt to accommodate the bending thereof as it passes about the pulley, as before.

A modified form of fastening means shown in Figures 5 to 7, inclusive, comprises a U-shaped member 14b formed from a flat steel plate 22b through each end of which is secured a post providing an arm 15b, each of which arms is provided with an integral ball 16b disposed within a cylindrical steel tube 23a inserted through opening 17 in the belting a short distance from each end thereof. A comparatively thin and flat steel retainer plate 18a is disposed about the upper portions of arms 15b, and is retained thereon by a spring steel locking member 24 of known type slotted at one end, at 25, this member 24 engaging into grooves 26 extending circumferentially about arms 15b a short distance from the upper ends thereof. The retainer plate 18a seats against the outer or top face of the belt, and plate 22b seats against the inner or bottom face of the belt, as shown in Figure 6. The balls 16b provide, in effect, pivot connections between the fastener member 14b and the end portions of the belting, located at the pitch line area of the belt and permitting flexing thereof in passage about the pulley, as above described.

In Figures 1 to 7, inclusive, I have shown the arms of the U-shaped fastener as provided with balls or spherical elements located at the central portion of the belt and providing pivot connections between the latter and the arms, as and for the reasons above stated. It is not necessary, however, that these pivot elements be in the form of balls or spheres, and they may be of any other suitable form. In Figure 8, for example, I have shown a substantially U-shaped member 14c comprising a plate 22c in the end portions of which the arm 15c are secured, each of these arms being provided with a half ball or hemispherical element 16c, at its inner side portion, disposed to contact the inner side of the associated tube 23. The elements 16c provide rounded areas of contact between the same and tubes 23, serving as pivot connections between the end portions of the belting and the fastening member, which function to permit of flexing or tilting of the end portions of the belt in the manner previously described. The elements for providing the pivot connections referred to may be of any other suitable shape or construction which will accommodate the desired relative tilting movement between the end portions of the belt and the fastening device.

In Figure 9 I have illustrated, fragmentarily and partly in section, the V-belt of my invention shown in Figures 5 to 7, inclusive, as passing about a V-pulley P of known type. The line *p—l* indicates the pitch line of the belt, and the lines *r—r* indicate radii of the pulley. It will be noted that the balls 16b of arms 15b of the fastener 14b contact tubes 23 at points on the pitch line, and that the radii *r—r* pass through the centers of balls 16b, the end portions of the belt b being flexed or bent to conform to the curvature of the pulley, with the result that the tubes 23 are inclined relative to arms 15b and in opposite relation, the outer side of the inner or lower end of the tube being considerably closer to its associated arm 15b than the inner side of the tube. The rounded area of contact between the balls 16b and the respective tubes 23 permits of that tilting movement, it being noted that the tube 23 should be of sufficient diameter to accommodate the relative tilting between the tube and the arm. Likewise, when a tube is not employed, the opening 17 through the end of the belting, such as shown in Figure 2, should be of proper diameter to accommodate relative tilting between arm 15 and the associated end portion of the belt. It will be understood that the size of the fastener may be varied in accordance with differences in size or thickness of the belt, and the size of the balls will also vary in accordance with different sizes of belts. For example, a belt intended for use with a pulley having a radius of six inches would be provided with a fastener provided on each arm with a ball one-quarter inch in diameter, that is, having a radius of one-eighth of an inch. The term "ball" as here used is not to be construed as in any way limiting since, as previously noted, a half ball or hemisphere may be used, or any other suitable element providing the proper contact or pivotal connection between the arms of the fastener and the belt may be employed.

As will be understood, and as above indicated, changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In a V-belt, a length of V-belting provided adjacent each end with an opening extending therethrough, and fastening means securing the ends of said belting together comprising a substantially U-shaped member having its arms extending through said openings and presenting rounded areas of contact with said belting about which the ends of the belt tilt in the travel of the belt about a pulley.

2. In a V-belt, a length of V-belting, tubular pressure and wear resistant members extending through said belting adjacent each end and in a direction from the top to the bottom thereof, and fastening means securing the ends of said belting together comprising a substantially U-shaped member having its arms extending through said tubular members and provided with rounded elements contacting said tubular members centrally of said belting providing pivots for relative tilting of said tubular members and said arms, the latter being otherwise of materally less cross-sectional area than the interior of the respective tubular members.

3. In a V-belt, a length of V-belting, cylindrical tubular pressure and wear resistant members extending through said belting adjacent each end and from top to bottom thereof, and fastening means securing the ends of said belting together comprising a substantially U-shaped member having its arms extending through said tubular members each provided with a ball of approximately the same diameter as the interior of the respective tubular members located at substantially the midlength of the latter, said arms being otherwise of materially less diameter than the interior of the respective tubular members.

4. In a V-belt, a length of V-belting, cylindrical tubular pressure and wear resistant members extending through said belting adjacent each end and from top to bottom thereof, a substantially U-shaped fastener having its arms extending through said tubular members from the bottom of said belting and each provided with a ball bearing against the associated tubular member at the approximate midlength of the side thereof nearer the corresponding end of the belting, said fastener securing the ends of the belting together with the end surfaces thereof in abutting relation, said arms except for said balls being of materially less diameter than the interior of the respective tubular members, and a flexible plate at the top of said belting secured over said arms restraining them against spreading apart.

5. As a new article of manufacture, a belt fastener of substantially U-shape having each arm provided with a substantially radially outwardly projecting extension located between its ends and disposed to be within the body of a belt to which said fastener is applied.

6. As a new article of manufacture, a belt fastener of substantially U-shape having each arm provided between its ends with a substantially radially outwardly projecting extension having an outer face of spherical form and disposed to be within the body of a belt to which said fastener is applied.

7. As a new article of manufacture, a belt fastener of substantially U-shape having each arm provided with a ball of appreciably greater diameter than said arm.

VICTOR R. CLARK.